United States Patent
Xiao et al.

(10) Patent No.: US 12,277,080 B2
(45) Date of Patent: Apr. 15, 2025

(54) SMART NETWORK INTERFACE CARD CONTROL PLANE FOR DISTRIBUTED MACHINE LEARNING WORKLOADS

(71) Applicant: Hewlett Packard Enterprise Development LP, Spring, TX (US)

(72) Inventors: Yunming Xiao, Evanston, IL (US); Diman Zad Tootaghaj, San Jose, CA (US); Aditya Dhakal, Santa Clarita, CA (US); Puneet Sharma, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 122 days.

(21) Appl. No.: 18/460,043

(22) Filed: Sep. 1, 2023

(65) Prior Publication Data

US 2025/0077456 A1    Mar. 6, 2025

(51) Int. Cl.
*G06F 13/36* (2006.01)

(52) U.S. Cl.
CPC .......... *G06F 13/36* (2013.01); *G06F 2213/40* (2013.01)

(58) Field of Classification Search
None
See application file for complete search history.

(56) References Cited

U.S. PATENT DOCUMENTS

| | | | |
|---|---|---|---|
| 9,680,774 B2 * | 6/2017 | Pirko | H04L 49/901 |
| 10,430,991 B2 | 10/2019 | Ma et al. | |
| 11,055,809 B2 | 7/2021 | Shah et al. | |
| 11,651,470 B2 * | 5/2023 | Zad Tootaghaj | G06F 9/5072 345/504 |
| 11,948,050 B2 * | 4/2024 | Creedon | G06F 9/45558 |
| 12,190,405 B2 * | 1/2025 | Rimmer | G06T 1/60 |
| 2018/0373570 A1 | 12/2018 | Xu et al. | |
| 2019/0324822 A1 | 10/2019 | Gottin et al. | |
| 2021/0110506 A1 | 4/2021 | Prakash et al. | |
| 2021/0216365 A1 * | 7/2021 | Zhao | G06F 9/30079 |
| 2021/0256418 A1 | 8/2021 | Creedon et al. | |
| 2021/0373972 A1 | 12/2021 | Kurkure et al. | |
| 2022/0188965 A1 | 6/2022 | Li et al. | |
| 2022/0237014 A1 | 7/2022 | Kurkure et al. | |
| 2022/0414817 A1 | 12/2022 | Zad Tootaghaj et al. | |

(Continued)

OTHER PUBLICATIONS

DPDK Project, About DPDK downloaded Jun. 22, 2024 (5 pages).

(Continued)

*Primary Examiner* — Elias Mamo
(74) *Attorney, Agent, or Firm* — Slater Matsil, LLP

(57) ABSTRACT

In certain embodiments, a method includes receiving, at an interface of a Smart network interface card (SmartNIC) of a computing device, via a network, a network data unit; processing, by a data allocator of a SmartNIC subsystem of the SmartNIC, the network data unit to make a determination that data included in the network data unit is intended for processing by an accelerator of the computing device, wherein the accelerator is configured to execute a machine learning algorithm; storing, by the data allocator and based on the determination, the data in a local buffer of the SmartNIC subsystem; identifying, by the data allocator, a memory resource associated with the accelerator; and transferring the data from the local buffer to the memory resource.

20 Claims, 5 Drawing Sheets

(56) References Cited

U.S. PATENT DOCUMENTS

2023/0089925 A1    3/2023    Cho et al.

OTHER PUBLICATIONS

Github, alibaba/clusterdata, clusterdata/cluster-trace-gpu-v2020 downloaded Jun. 22, 2024 (20 pages).
Github, AliyunContainerService / gpushare-device-plugin, GPU Sharing Device Plugin for Kubernetes Cluster downloaded Jun. 22, 2024 (2 pages).
Github, Deepomatic / shared-gpu-nvidia-k8s-device-plugin downloaded Jun. 22, 2024 (5 pages).
Github, intel/linux-intel-its downloaded Jun. 22, 2024 (5 pages).
Google for Developers, About OR-Tools, Jan. 2023 (2 pages).
Hsu et al., Simultaneous and Heterogenous Multithreading, MICRO '23, Oct. 28-Nov. 1, 2023 (16 pages).
Imagenet, About ImageNet downloaded Jun. 22, 2024 (2 pages).
Kubernetes, Manage clusters with different types of GPUs downloaded Jun. 22, 2024 (3 pages).
Marvell, Marvell LiquidIO III, Sep. 2020 (3 pages).
NVIDIA Bluefield-3 DPU Programmable Data Center Infrastructure On-a-Chip, Dec. 2021 (2 pages).
NVIDIA Bluefield-3 Networking Platform Datasheet, Nov. 2023 (2 pages).
NVIDIA Converted Accelerators downloaded Jun. 22, 2024 (8 pages).
NVIDIA DOCA Comm Channel, Programming Guide, May 2023 (31 pages).
NVIDIA DOCA DMA docs downloaded Jun. 22, 2024 (16 pages).
NVIDIA DOCA RDMA downloaded Jun. 22, 2024 (59 pages).
NVIDIA GPUDirect, Enhancing Data Movementand Access for GPUs downloaded Jun. 22, 2024 (5 pages).
NVIDIA Mellanox Innova-2 Flex Open Programmable SmartNIC downloaded Jun. 22, 2024 (6 pages).
NVIDIA Multi-Instance GPU User Guide, Mar. 2024 (58 pages).
NVIDIA, Multi-Process Service, Feb. 2024 (38 pages).
NVIDIA, NVIDIA Bluefield-2 DPU Datasheet, Data Center Infrastructure on a Chip, Nov. 2023 (2 pages).
Tootaghaj et al., U.S. Appl. No. 18/299,855 entitled Job Allocations to Graphics Processing Units With Tenant Isolation filed Apr. 13, 2023 (38 pages).
Tootaghaj et al., U.S. Appl. No. 18/765,440 entitled Job Allocations to Fractions of Parallel Processing Units (PPUs) filed Jul. 8, 2024 (63 pages).
Tootaghaj et al., U.S. Appl. No. 18/765,445 entitled DMA Transfers of Job Data From an Adapter to Parallel Processing Unit (PPU) Fractions filed Jul. 8, 2024 (64 pages).
Cho et al., SLA-Driven ML Inference Framework for Clouds with Heterogeneous Accelerators, Proceedings of Machine Learning and Systems (MLSys), 2022, 13 pages.
Crankshaw et al., "Clipper: A low-latency online prediction serving system." NDSI, 2017, 17 pages.
Dakkak et al., "Trims: Transparent and isolated model sharing for low latency deep learning inference in function-as-a-service." CLOUD, 2018, 13 pages.
Deepomatic, Fork of the NVIDIA device plugin for Kubernetes with support for shared GPUs by declaring GPUs multiple times downloaded Feb. 6, 2023 (6 pages).
Devlin et al., "BERT: Pre-training of Deep Bidirectional Transformers for Language Understanding", 2019, 16 pages.
Github, AliyunContainerService / gpushare-device-plugin, GPU Sharing Device Plugin in Kuberntes downloaded Feb. 6, 2023 (2 pages).
Hayashi et al., "ESPnet-TTS: Unified, Reproducible, and Integratable Open Source End-to-End Text-to-Speech Toolkit", 2020, 5 pages.
He et al., "Deep Residual Learning for Image Recognition", In Proceedings of the IEEE conference on computer vision and pattern recognition, 2016, 9 pages.
Intel, CPU vs. GPU: Making the Most of Both downloaded Feb. 6, 2023 (4 pages).
Junguk, et al., "SLA-Driven ML Inference Framework For Clouds With Heterogeneous Accelerators." Proceedings of Machine Learning and Systems 4 (2022), 13 pages.
Murray, et al., "tf. data: a machine learning data processing framework", Proceedings of the VLDB Endowment, 2021, 16 pages.
NVIDIA Corporation, "NVIDIA TensorRT", available online at <https://web.archive.org/web/20230921054928/https://developer.nvidia.com/tensorrt>, Sep. 21, 2023, 5 pages.
NVIDIA, "NVIDIA Triton Inference Server", available online at <https://docs.nvidia.com/deeplearning/triton-inference-server/user-guide/docs/index.html>, Jan. 18, 2024, 2 pages.
NVIDIA, Multi-Process Service, Oct. 2022 (37 pages).
Paras Jain et al., "Dynamic Space-Time Scheduling for GPU Inference." arXiv preprint, 2018, 9 Pages.
Paras Jain et al., "The OoO VLIW JIT Compiler for GPU Inference." arXiv preprint, 2019, 7 pages.
Romero et al., "INFaaS: a Model-less and Managed Inference Serving System", Dec. 15, 2020, 16 pages.
Sapio et al., "Scaling Distributed Machine Learning with In-Network Aggregation", Proceedings of the 18th USENIX Symposium on Networked Systems Design and Implementation, 2021, 25 pages.
Schedule GPUs_Kubernetes last modified Oct. 18, 2022 (3 pages).
Sengupta et al., "Multi-tenancy on GPGPU-based servers." 7th international workshop on Virtual-ization technologies in distributed computing, 2013, 8 Pages.
Skolnick et al., "AlphaFold 2: Why It Works and Its Implications for Understanding the Relationships of Protein Sequence, Structure, and Function", 2021, 8 pages.
Weng et al., "MLaaS in the Wild: Workload Analysis and Scheduling in Large-Scale Heterogeneous GPU Clusters", Apr. 4-6, 2022, 17 pages.
Wikipedia, CUDA, Stable release: 12.1.0 / Mar. 1, 2023 (23 pages).
Xiao et al., "Conspirator: SmartNIC-Aided Control Framework for ML Workloads Orchestration", 2023, 6 pages.
Yeh et al., "Pagoda: Fine-grained gpu resource virtualization for narrow tasks." CM SIGPLAN Notices, 2017, 13 pages.
Zhou, et al., "Deep interest network for click-through rate prediction", In Proceedings of the 24th ACM SIGKDD international conference on knowledge discovery data mining, 2018, 9 pages.

\* cited by examiner

SMART NETWORK INTERFACE CARD CONTROL PLANE FOR DISTRIBUTED MACHINE LEARNING WORKLOADS

BACKGROUND

Machine learning applications are, in certain scenarios, becoming increasingly distributed. However, performance of distributed machine learning workloads may suffer from communication costs, such as the time and/or computing resources for moving data (e.g., training data, validation data, input data, etc.) to be operated on by a machine learning algorithm from the source of the data to the computing resource executing the machine learning algorithm (e.g., an accelerator such as a graphics processing unit). Such data movement may suffer, for example, from consuming significant processing resources to process the data before moving the data to a relevant processing entity, long queues to await such data-movement related processing, low utilization of accelerator resources when allocation of execution tasks is relatively coarse-grained, and/or potentially improper allocation of resources when accelerators of a computing device have heterogeneous characteristics.

BRIEF DESCRIPTION OF THE DRAWINGS

Certain embodiments discussed herein will be described with reference to the accompanying drawings listed below. However, the accompanying drawings illustrate only certain aspects or implementations of embodiments described herein by way of example and are not meant to limit the scope of the claims.

DETAILED DESCRIPTION

Figure 1:
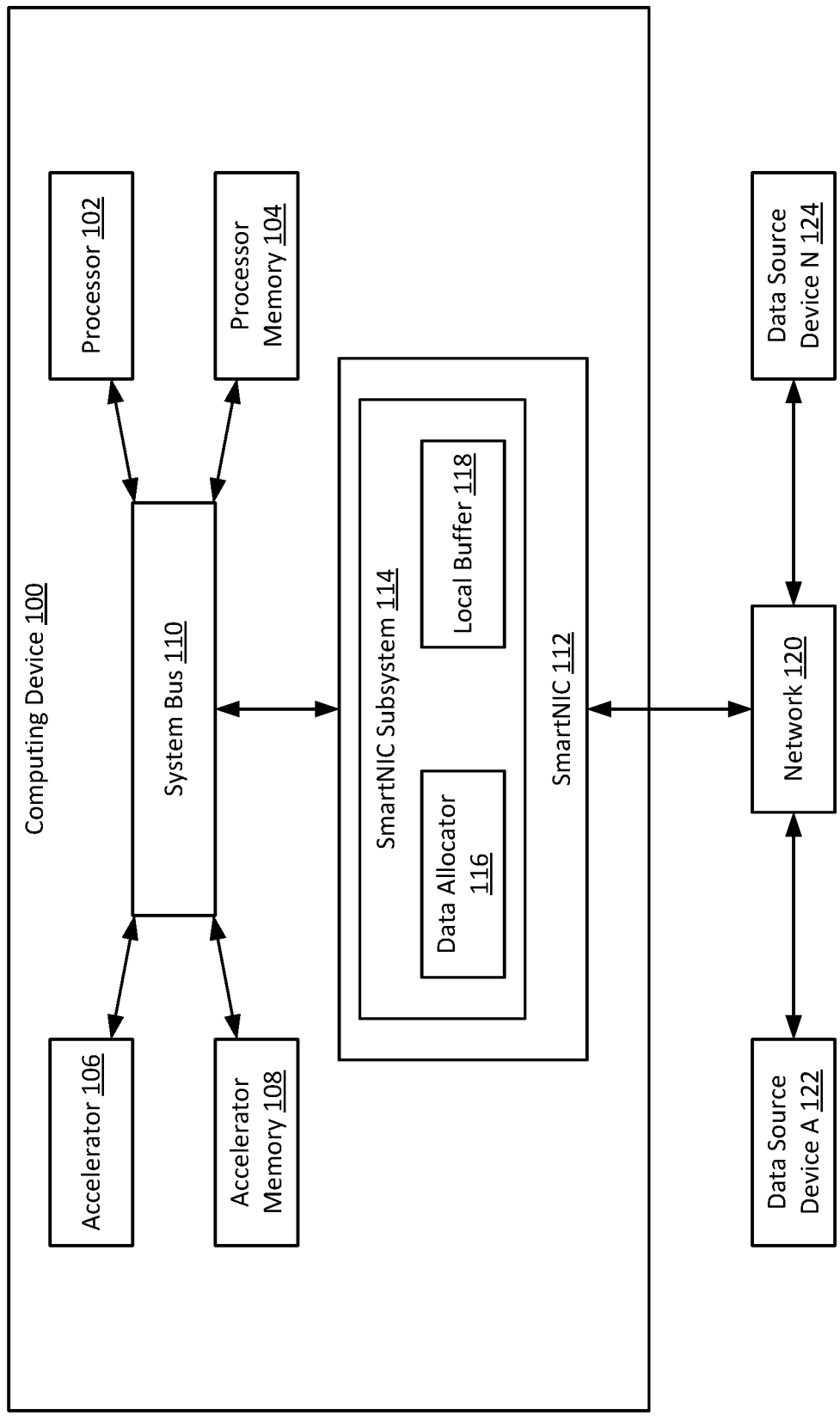
FIG. 1 illustrates a block diagram of an example system for implementing a SmartNIC control plane for data allocation, in accordance with one or more embodiments of this disclosure.

Certain embodiments will now be described with reference to the accompanying figures.

In general, embodiments described herein relate to methods, systems, and non-transitory computer readable media storing instructions for offloading a control plane for distributed machine learning workloads to a smart network interface card (SmartNIC).

Machine learning algorithms are increasingly being applied for a variety of applications, from various research fields, to increasingly routine aspects of daily lives (e.g., image recognition, speech recognition, computer vision, predictive analysis, etc.). Executing such machine learning algorithms on computing devices may include processing relatively large amounts of data, for activities such as training, validation, and execution of machine learning algorithms.

To potentially improve the execution of machine learning algorithms, machine learning algorithms may be executed, at least in part, using accelerators included in and/or operatively connected to computing devices. In one or more embodiments, an accelerator (also referred to as a hardware accelerator) is a processing unit configured with special purpose hardware to increase or otherwise improve processing of data for any of a variety of possible workloads and applications (e.g., machine learning workloads). Examples of accelerators include, but are not limited to, graphics processing units (GPUs), data processing units (DPUs), tensor processing units (TPUs), associative processing units (APUs), vision processing units (VPUs), quantum processing units (QPUs), and various other processing units that use special purpose hardware (e.g., field programmable gate arrays (FPGAs), System-on-a-Chips (SOCs), digital signal processors (DSPs), etc.).

Computing devices that include accelerators may be configured such that each of the one or more accelerators of the computing device has associated dedicated memory resources (e.g., random access memory (RAM) devices) and/or portions thereof. Data to be operated on by an accelerator may be placed into memory resources associated with the accelerator to facilitate processing of the data by the accelerator (e.g., as input to a machine learning algorithm).

As the types and quantity of computing devices expand and proliferate, various applications using machine learning algorithms are becoming increasingly distributed (e.g., data from one or more computing devices may be transmitted to another computing device to be used as input to a machine learning algorithm), which may be referred to as distributed machine learning. In such scenarios, data being provided from a source external to a computing device (e.g., over a network) may be received at a network interface (e.g., a network interface card (NIC)) of a computing device, and ultimately may be transferred to memory resources associated with an accelerator of the computing device to be processed during execution of a machine learning algorithm.

Some techniques for receiving data for processing by accelerators executing machine learning algorithms include receiving the data at a NIC. Such data may be received, for example, in the form of network data units, which may include a payload (e.g., data intended for processing by an accelerator) within any number of headers and/or trailers, which may be fields of information intended to allow receiving entities to perform various actions to propagate the network data unit towards a destination (e.g., another device, an application, etc.). Such fields of information may include, but are not limited to, various items of information related to protocols being used for implementing data transmission (e.g., media access control (MAC), internet protocol (IP), transmission control protocol (TCP), user datagram protocol (UDP), address resolution protocol (ARP), hypertext transfer protocol (HTTP), file transfer protocol (FTP), virtual extensible local area network (VXLAN) protocol, multiprotocol label switching (MPLS) segment routing (SR) protocols, etc.), addresses and/or labels related to such protocols (e.g., IP addresses, MAC addresses, label stacks, etc.), fields related to error identification and/or correction, etc.

To ultimately get data from the NIC to a memory resource associated with an accelerator of a computing device, a network data unit may be passed to a central processing unit (CPU) of the computing device, where a network stack, control plane, etc. may be used to process the network data unit to determine the intended destination of the network data unit (e.g., a memory resource associated with an accelerator). To that end, the data from the payload of the network data unit may be placed in a memory resource associated with the CPU, and, after processing by the CPU, copied to the memory resource associated with the accelerator.

However, the above-described technique for providing data received over a network to a memory resource associated with an accelerator may consume CPU cycles and other compute resources that could otherwise be used for performing other tasks, thereby reducing the overall performance of a computing device when data intended for use in executing machine learning algorithms on accelerators is received at the computing device. Also, the above-described technique may add more delay to the data processing pipeline since the data movement and processing from the NIC to the CPU itself can add extra delay. Such performance degradation may be caused, at least in part, by the processing overhead incurred to process received network data units, and to make a decision to transfer data within a network data unit to a memory resource associated with an accelerator, which may lead to a higher CPU utilization rate. The problem may be exacerbated when network data units are placed into potentially long queues to await processing while a CPU is otherwise engaged (e.g., especially when the data in the payload of the queued network data units is intended for relatively short tasks). Additional problems that may impact the execution speeds of machine learning algorithms executing on accelerators include coarse grained allocation of accelerator resources (e.g., underutilization of accelerator processing cycles), and improper allocation of processing tasks to accelerator resources in systems with heterogeneous sets of accelerators.

To potentially address one or more of the above-described problems of getting data received over a network to memory resources associated with an accelerator of a computing device, certain embodiments of this disclosure use a SmartNIC to perform all or any portion of the processing tasks related to improving data placement in memory resources associated with one or more accelerators of a computing device, thereby reducing the processing burden on other components of the computing device such as, for example, the CPU.

In one or more embodiments, a SmartNIC is a NIC that includes additional processing resources relative to a standard NIC. A SmartNIC may include various hardware components, subsystems, etc. configured to perform processing on received network data units to offload at least some of such processing from one or more CPUs of a computing device. Such hardware components may include, but are not limited to, FPGAs, SOCs DSPs, etc. Such hardware components may be, or be included in, one or more subsystems (e.g., an advanced reduced instruction set computer (RISC) machine (ARM) subsystem) of a SmartNIC.

In one or more embodiments, a SmartNIC subsystem includes a variety of components, including, but not limited to, one or more processing units, a data allocator executing using the one or more processing units, and a local buffer. In one or more embodiments, a SmartNIC subsystem is used to identify and process, at least in part, incoming network data units to determine whether the network data unit includes data intended for processing by an accelerator (e.g., data to be used as input for a machine learning algorithm being executed by an accelerator).

Identification of a network data unit that includes data intended for processing by an accelerator executing a machine learning algorithm may include parsing the various fields of the network data unit outside the payload of the network data unit to determine that the data therein is data to be used for executing (e.g., as input) a machine learning algorithm. As an example, based on one or more addresses (e.g., an IP address, a MAC address, etc.) or other information (e.g., TCP header port information), a data allocator of a SmartNIC subsystem may determine that the data of the network data unit is intended for an application configured to execute a machine learning algorithm using the data (e.g., as input).

In one or more embodiments, when such a network data unit is identified, data therein may be placed in a local buffer of the SmartNIC subsystem. The SmartNIC may be operatively connected to a system bus (e.g., a Peripheral Component Interconnect (PCI) bus) to which one or more CPUs and one or more accelerators (e.g., GPUs) of a computing device are also operatively connected. Thus, based on the parsing of the network data unit, the data allocator of a SmartNIC subsystem may determine that data from the network data unit is intended for processing by an accelerator of the computing device, and have a path from its local buffer to a memory resource associated with the accelerator (e.g., via a system bus) through which the data may directly be placed into the memory resource associated with the accelerator without having to first be processed by a CPU of the computing device, or use any memory resources associated with such a CPU. In one or more embodiments, performing such processing in a SmartNIC subsystem offloads the work of processing network data units that include data intended as for machine learning algorithms being executed by accelerators from the one or more CPUs of a computing device to the SmartNIC subsystem, while at the same time potentially improving the execution times of machine learning algorithms executed by accelerators by getting data into memory resources associated with the accelerators more quickly.

However, to perform the above-described data transfer from the local buffer of a SmartNIC subsystem directly to a memory resource of an accelerator of a computing device, the data allocator of the SmartNIC subsystem further needs to be configured to know the appropriate memory resource to which the data is to be transferred. To that end, prior to receiving a network data unit (e.g., during an initialization of the SmartNIC, the computing device, the accelerators, etc.), the data allocator may be provided (e.g., by one or more CPUs of the computing device) with information related to the configuration of one or more accelerators of the computing device. Such information may include, but is not limited to, the existence of and configuration of the accelerators of the computing device (including any information related to virtualization of the accelerators, which may be referred to as accelerator virtualization information), various characteristics and attributes of the accelerators, pointers to memory address ranges of memory resources associated with the accelerators, and/or applications associated with the accelerators and/or associated memory address ranges.

In one or more embodiments, one or more accelerators of a computing device may be virtualized. In one or more embodiments, virtualizing an accelerator may include dividing an accelerator into any number of portions of the accelerator, each of which may be referred to as an accelerator slice. Each accelerator slice may be associated with its own memory resources and memory address range. Thus, information provided to the data allocator of a SmartNIC subsystem may include, in some embodiments, identification of accelerator slices, associated memory ranges, and applications (e.g., machine learning applications executing machine learning algorithms) associated with the accelerator slices and/or memory address ranges.

In one or more embodiments, once the data allocator of a SmartNIC subsystem has been provided the aforementioned information (e.g., during an initialization phase), the data allocator may receive incoming network data units, parse the network data units to determine that data therein is intended for processing by an accelerator executing a machine learning algorithm, place the data in a local buffer of the SmartNIC subsystem, determine the memory address range of the memory resource associated with the accelerator or accelerator slice executing the machine learning algorithm, and directly transfer the data from the local buffer to the appropriate memory resource via a system bus, all without requiring processing of the received network data unit by one or more CPUs of a computing device.

In one or more embodiments, the data allocator may be further configured to perform the above-described data placement by implementing additional techniques to improve the data placement. One such technique includes performing the data placement from the local buffer to the appropriate memory resource of an accelerator or accelerator slice based on results of execution of a bin packing algorithm. In one or more embodiments, a bin packing algorithm is an algorithm designed to solve an optimization problem of where to place data.

In the context of embodiments of this disclosure, a bin packing algorithm may be executed to determine which memory resource associated with an accelerator or accelerator slice into which data from a particular one or more network data units should be placed to achieve more optimal execution speeds for machine learning algorithms executing on the accelerators or accelerator slices. As an example, any number of applications configured to use machine learning algorithms may execute on a computing device and may be configured to execute the machine learning algorithms using any number of the accelerators and/or accelerator slices of a computing device. In one or more embodiments, the results of such a bin packing algorithm include information indicating a particular memory resource associated with an accelerator and/or accelerator slice into which data received in a network data unit should be placed.

In one or more embodiments, a bin packing algorithm is executed by the SmartNIC subsystem to avoid using CPU cycles to execute the bin packing algorithm, and the results may be provided to the data allocator of the SmartNIC subsystem. Additionally, or alternatively, in some embodiments, a SmartNIC subsystem may request one or more CPUs of a computing device to execute a bin packing algorithm and provide the results to the data allocator of the SmartNIC subsystem. In either case, the data allocator may use the results of execution of the bin packing algorithm when making a decision as to which memory resource associated with an accelerator or accelerator slice data received in a network data unit should be placed.

In one or more embodiments, the data allocator may be further configured to perform data placement for data intended to be used during execution of a machine learning algorithm based at least in part on information related to monitoring service rates of accelerators and/or accelerator slices of a computing device. In certain embodiments, a computing device may be configured with a heterogeneous set of accelerators and associated resources. In such embodiments, the performance of the accelerators may vary (e.g., in a heterogeneous set of accelerators). Thus, it may be advantageous to understand the differing service rates that may be achieved using the different accelerators of a computing device. In one or more embodiments, a service rate of an accelerator and/or accelerator slice refers to the speed at which the accelerator can process tasks or data. In one or more embodiments, determining the service rates of various accelerators and/or accelerator slices of a computing device includes monitoring execution times of workloads executed using the accelerators and/or accelerator slices.

Such monitoring may be performed, for example, by a monitoring module. Such a monitoring module may execute on a SmartNIC subsystem, one or more CPUs, or a combination thereof. In one or more embodiments, the monitoring module is configured to cause execution of a workload (e.g., execution of a machine learning algorithm) on the different accelerators and/or accelerator slices, and to measure the service rates or service times of the workloads. In one or more embodiments, a service time is the execution time of a workload, where lower is better, and a service rate refers to the execution speed, where higher is better. The differences in service rate or service time of the workloads may determine, at least in part, an appropriate distribution of data when more than one accelerator and/or accelerator slice is being used to execute one or more machine learning algorithms. As an example, a monitoring module may determine that a given workload (e.g., execution of a machine learning algorithm) executes at a higher service rate (and has a lower service time) when data for the workload is distributed between the accelerators and/or accelerator slices in a particular proportion.

In one example, a particular accelerator receives 65% of the data, and another accelerator receives 35% of the data. Such a distribution of data may thus alter a more common 50/50 distribution of the data (e.g., as is done in by various schedulers, such as a Kubernetes scheduler). In one or more embodiments, as discussed above, the monitoring module may execute on the SmartNIC subsystem, the CPU, or a combination thereof. In any case, in one or more embodiments, the results of the analysis of service rates and/or service times of the various accelerators and/or accelerator slices is provided to the data allocator of the SmartNIC subsystem to be used when determining what memory resource should receive data received in a network data unit and intended to be used by one or more accelerators and/or accelerator slices executing a machine learning algorithm. Although this example uses a specific proportion of 65% to 35%, any proportion may be used for data distribution between accelerators and/or accelerator slices without departing from the scope of embodiments disclosed herein.

Certain embodiments of this disclosure may improve data placement for distributed machine learning workloads, and thus may improve performance of computing devices, by offloading decisions related to the data placement to a data allocator of a SmartNIC subsystem. The data allocator may make such decisions based at least in part on parsing received network data units to identify that data therein is intended to be processed by one or more accelerators and/or accelerator slices executing a machine learning algorithm, by being configured to know which memory range or ranges of memory resources associated with accelerators or accelerator slices such data should be placed, by being configured with the results of execution of a bin packing algorithm, or an alternative heuristic algorithm such as first fit or best fit algorithms, to further enhance more optimal data placement, and by being configured with results of service rate monitoring of a monitoring module to place the data in appropriate proportions among accelerators and/or accelerator slices. Based on such information, the data may be transferred directly from a local buffer of a SmartNIC subsystem to appropriate memory resources associated with accelerators and/or accelerator slices via a system bus, thereby bypassing one or more CPUs and associated resources of a computing device.

FIG. 1 illustrates a block diagram of an example system for implementing a SmartNIC control plane for data allocation in accordance with or more embodiments of this disclosure. As shown in FIG. 1, the system includes a computing device 100, a network 120, a data source device A 122, and a data source device N 124. The computing device may include a processor 102, processor memory 104, an accelerator 106, accelerator memory 108, a system bus 110, and a SmartNIC 112. The SmartNIC 112 may include a SmartNIC subsystem 114. The SmartNIC subsystem 114 may include a data allocator 116 and a local buffer 118. Each of these components is described below.

In one or more embodiments, as used herein, the computing device 100 may be any single computing device, a set of computing devices, a portion of one or more computing devices, or any other physical, virtual, and/or logical grouping of computing resources. In one or more embodiments, the computing device 100 is any device, portion of a device, or any set of devices capable of electronically processing instructions and may include, but is not limited to, any of the following: one or more processors (e.g. components that include circuitry), memory (e.g., random access memory (RAM)), input and output device(s), non-volatile storage hardware (e.g., solid-state drives (SSDs), hard disk drives (HDDs) (not shown)), one or more physical interfaces (e.g., network ports, storage ports), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), an Internet of Things (IoT) device, an array of nodes of computing resources, a supercomputing device, a data center or any portion thereof, and/or any other type of computing device with the aforementioned requirements. In one or more embodiments, any or all the aforementioned examples may be combined to create a system of such devices, or may be partitioned into separate logical devices, which may collectively be referred to as a computing device. Other types of computing devices may be used without departing from the scope of embodiments described herein, such as, for example, the computing device shown in FIG. 5 and described below.

In one or more embodiments, the storage (not shown) and/or memory of a computing device or system of computing devices may be and/or include one or more data repositories for storing any number of data structures storing any amount of data (e.g., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any storage (not shown) and/or memory of a computing device or system of computing devices may be considered, in whole or in part, as non-transitory computer readable mediums storing software and/or firmware.

Such software and/or firmware may include instructions which, when executed by the one or more processors (not shown) and/or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods, processes, etc. of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

Although FIG. 1 shows one computing device 100, one having ordinary skill in the relevant art, and the benefit of this Detailed Description, will appreciate that the system may include any number of computing devices, any number of which may be collectively considered a computing device as used herein. All or any portion of the computing devices may be the same type or be different types of computing devices.

In one or more embodiments, the computing device 100 includes a processor 102. In one or more embodiments, the processor 102 is any component that includes circuitry and/or other hardware for executing instructions (e.g., of a computer program). As an example, such circuitry may be integrated circuitry implemented, at least in part, using transistors implementing components such as arithmetic logic units, control units, registers, data buffers, control buffers, etc. In one or more embodiments, the processor 102 may include any number of additional components (e.g., cache memory). In one or more embodiments, the processor 102 is configured to retrieve and/or decode instructions, which may then be executed. Execution of instructions may include operating on data, which may include reading and/or writing data. In one or more embodiments, instructions and/or data used by a processor are stored, at least temporarily, in memory of the computing device 100 (e.g., the processor memory 104). The processor 102 may perform various operations for executing software, such as operating systems, applications, etc. The processor 102 may cause data to be written from memory to storage of the computing device 100 and/or cause data to be read from storage via memory of the computing device 100. The processor 102, may, for example, be a CPU, and may have any number of processing cores. Although FIG. 1 shows the computing device 100 as having a single processor 102, the computing device 100 may include any number of processors without departing from the scope of embodiments disclosed herein.

In one or more embodiments, the computing device 100 includes the processor memory 104. The processor memory 104 may be operatively connected to the processor 102. In one or more embodiments, the processor memory 104 is any one or more memory devices. In one or more embodiments, a memory device is any type of computer memory. In one or more embodiments, a memory device includes a volatile storage device. As an example, a memory device may include RAM. In one or more embodiments, data stored in a memory device is located at any number of memory addresses, and is thus accessible to the processor 102 using the memory addresses. The processor 102 may write data to and/or read data from the processor memory 104. Although FIG. 1 shows a single processor memory 104, the computing device 100 may include any amount of processor memory without departing from the scope of embodiments disclosed herein.

In one or more embodiments, the computing device 100 includes an accelerator 106. In one or more embodiments, the accelerator 106 (which may also be referred to as a hardware accelerator) is a processing unit configured with special purpose hardware to increase or otherwise improve processing of data for any of a variety of possible workloads and applications (e.g., machine learning workloads). Examples of accelerators include, but are not limited to, graphics processing units (GPUs), data processing units (DPUs), tensor processing units (TPUs), associative processing units (APUs), vision processing units (VPUs), quantum processing units (QPUs), and various other processing units that use special purpose hardware (e.g., field programmable gate arrays (FPGAs), System-on-a-Chips (SOCs), digital signal processors (DSPs), etc.). Computing devices (e.g., the computing device 100) that include accelerators (e.g., the accelerator 106) may be configured such that each of the one or more accelerators of the computing device has associated dedicated memory resources (e.g., random access memory (RAM) devices) and/or portions thereof. Data to be operated on by an accelerator may be placed into memory resources (e.g., the accelerator memory 108) associated with the accelerator to facilitate processing of the data by the accelerator (e.g., as input to a machine learning algorithm). Although FIG. 1 shows the computing device 100 as including a single accelerator 106, the computing device 100 may include any number of accelerators without departing from the scope of embodiments disclosed herein. In embodiments in which the computing device 100 includes multiple accelerators, the accelerators may all be of the same type, or may be of different types. Different types of accelerators of a computing device (e.g., the computing device 100) may be referred to as heterogeneous accelerators. In one or more embodiments, heterogeneous accelerators are accelerators that have differing characteristics, attributes, etc. such as, for example, different performance characteristics (e.g., different processing speeds, differing numbers of processing cores, differing memory capacities, etc.).

In one or more embodiments, the computing device 100 includes the accelerator memory 108. The accelerator memory 108 may be any one or more memory devices (described above). The accelerator memory 108 may be operatively connected to the accelerator 106. The accelerator memory 108 may separate from the processor memory 104. Additionally, or alternatively, although not shown in FIG. 1, the accelerator memory 108 may be wholly or partially included in the same one or more memory devices as the processor memory 104. As an example, one or more memory devices may be logically divided (e.g., using memory address ranges), with one portion serving as the processor memory 104, and another portion serving as the accelerator memory 108. Although FIG. 1 shows the computing device 100 as including a single accelerator memory 108, the computing device 100 may include any amount of accelerator memory without departing from the scope of embodiments disclosed herein.

In one or more embodiments, the computing device 100 includes the system bus 110. In one or more embodiments, the system bus 110 is any hardware, software, firmware, or any combination thereof that is configured to facilitate the movement of data from one or more portions of the computing device 100 to any other one or more portions of the computing device 100. As an example, all or any portion of the processor 102, the processor memory 104, the accelerator 106, the accelerator memory 108, any number of storage devices (not shown), the SmartNIC 112, any other input and/or output devices (not shown), and/or any other components of the computing device 100 may be operatively connected via the system bus 110. The system bus 110 may carry data to be operated on by processing elements (e.g., the processor 102, the accelerator 106, etc.), addresses (e.g., memory addresses), control signals, etc. As an example, all or any portion of the system bus 110 may be a PCI bus. Although FIG. 1 shows the computing device 100 as including a single system bus 110, the computing device 100 may include any number of system buses without departing from the scope of embodiments disclosed herein.

In one or more embodiments, the computing device 100 includes the SmartNIC 112. In one or more embodiments, a NIC is an input and/or output component configured to provide an interface between the computing device 100 and a network (e.g., the network 120, described below). In one or more embodiments, the SmartNIC 112 is a NIC that includes additional processing resources relative to a standard NIC. A SmartNIC may include various hardware components, subsystems, etc. configured to perform processing on received network data units to offload at least some of such processing from one or more CPUs of a computing device. Such hardware components may include, but are not limited to, FPGAs, SOCs DSPs, etc. Such hardware components may be, or be included in, one or more subsystems (e.g., a RISC-ARM subsystem) of a SmartNIC.

In one or more embodiments, the SmartNIC 112 is used to receive and/or transmit network data units. A network data unit may include a payload (e.g., data intended for processing by an accelerator) within any number of headers and/or trailers, which may be fields of information intended to allow receiving entities to perform various actions to propagate the network data unit towards a destination (e.g., another device, an application, etc.). Such fields of information may include, but are not limited to, various items of information related to protocols being used for implementing data transmission (e.g., media access control (MAC), internet protocol (IP), transmission control protocol (TCP), user datagram protocol (UDP), address resolution protocol (ARP), hypertext transfer protocol (HTTP), file transfer protocol (FTP), virtual extensible local area network (VXLAN) protocol, multiprotocol label switching (MPLS) segment routing (SR) protocols, etc.), addresses and/or labels related to such protocols (e.g., IP addresses, MAC addresses, label stacks, etc.), fields related to error identification and/or correction, etc. The SmartNIC 112 may be configured with interfaces of any type for receiving and/or transmitting network data units, such as, for example, wireless interfaces, wired interfaces, etc. Although FIG. 1 shows the computing device 100 as including a single SmartNIC 112, the computing device may include any number of SmartNICs without departing from the scope of embodiments disclosed herein.

In one or more embodiments, the SmartNIC 112 includes the SmartNIC subsystem 114. In one or more embodiments, the SmartNIC subsystem 114 is any hardware, software, firmware, or combination thereof that is configured to provide processing capabilities on the SmartNIC 112. The SmartNIC subsystem 114, may, for example, be an ARM subsystem. In one or more embodiments, the SmartNIC subsystem 114 is used to identify and process, at least in part, incoming network data units to determine whether the network data unit includes data intended for processing by an accelerator (e.g., data to be used as input for or otherwise for executing a machine learning algorithm being executed by an accelerator), such as the accelerator 106.

In one or more embodiments, the SmartNIC subsystem 114 includes the data allocator 116. In one or more embodiments, the data allocator 116 is any hardware, software, firmware, or any combination thereof that is configured to use one or more processing units and/or other resources of the SmartNIC subsystem 114 to perform at least a portion of the aforementioned processing of network data units.

In one or more embodiments, the SmartNIC subsystem 114 includes the local buffer 118. In one or more embodiments, the local buffer 118 is a hardware component configured to store data of any type, at least temporarily. In one or more embodiments, the local buffer 118 is a data repository (described above). As an example, the local buffer 118 may be configured to store at least a portion of data received in one or more network data units received at the SmartNIC 112. In one or more embodiments, the local buffer 118 is operatively connected to the processor memory 104 and to the accelerator memory 108 (e.g., via the system bus 110). As such, for example, in one or more embodiments, data stored in the local buffer 118 may be transferred from the local buffer 118 to the accelerator memory 108 when the data allocator 116 identifies that data in one or more network data units is intended for processing by the accelerator 106.

In one or more embodiments, identification of a network data unit that includes data intended for processing by an accelerator (e.g., the accelerator 106) executing a machine learning algorithm may include parsing (e.g., by the data allocator 116) the various fields of received network data units to determine that the data therein is data to be used for executing (e.g., as input) a machine learning algorithm. As an example, based on one or more addresses (e.g., an IP address, a MAC address, etc.) or other information (e.g., TCP header port information), the data allocator 116 of the SmartNIC subsystem 114 may determine that the data of the network data unit is intended for an application configured to execute a machine learning algorithm using the data (e.g., as input). Such data may, for example, be placed into the local buffer 118, and transmitted via the system bus 110 to the accelerator memory 108 for processing by the accelerator 106. Processing of network data units by the data allocator 116 of the SmartNIC 112 to move data received over a network to accelerator memory 108 is discussed further in the descriptions of FIG. 2 and FIG. 3, below.

In one or more embodiments, the computing device 100 is operatively connected to the network 120 (e.g., via the SmartNIC 112), which may provide an operative connection between the computing device 100 and any number of other devices (e.g., the data source device A 122, the data source device N 124, etc.). A network (e.g., the network 120) may refer to an entire network or any portion thereof (e.g., a logical portion of the devices within a topology of devices). The network 120 may include a datacenter network, a wide area network, a local area network, a wireless network, a cellular phone network, an InfiniBand network, and/or any other suitable network that facilitates the exchange of information from one part of the network to another. The network 120 may be a combination of any of the aforementioned network types. The network 120 may be located at a single physical location or be distributed at any number of physical sites. In one or more embodiments, a network may be coupled with or overlap with, at least in part, the Internet.

In one or more embodiments, as discussed above, the network 120 may operatively connect the computing device 100 to any number of data source devices (e.g., 122, 124). In one or more embodiments, a data source device is any device that is configured to transmit data to the computing device 100 over the network 120 via the SmartNIC 112. In one or more embodiments, a data source device is a computing device (described above). As an example, a data source device (e.g., 122, 124) may be a device configured to perform operations that generate certain types of data that may be used as input to a machine learning algorithm to be executed using the accelerator 106 of the computing device 100. In such scenarios, a data source device may be configured to transmit such data to the computing device 100 via the network 120 as one or more network data units, where the data allocator 116 of the SmartNIC subsystem 114 parses the network data units to determine where to place data included therein. Although FIG. 1 shows two data source devices, one having ordinary skill in the art, and the benefit of this Detailed Description, will appreciate that any number of data source devices may be operatively connected to the computing device 100 via the network 120.

While FIG. 1 shows a particular configuration of components, other configurations may be used without departing from the scope of embodiments described herein. For example, although FIG. 1 shows certain components as part of the same device, any of the components may be grouped in sets of one or more components which may exist and execute as part of any number of separate and operatively connected devices. As another example, a single component may be configured to perform all, or any portion of the functionality performed by the components shown in FIG. 1. Accordingly, embodiments disclosed herein should not be limited to the configuration of components shown in FIG. 1.

Figure 2:
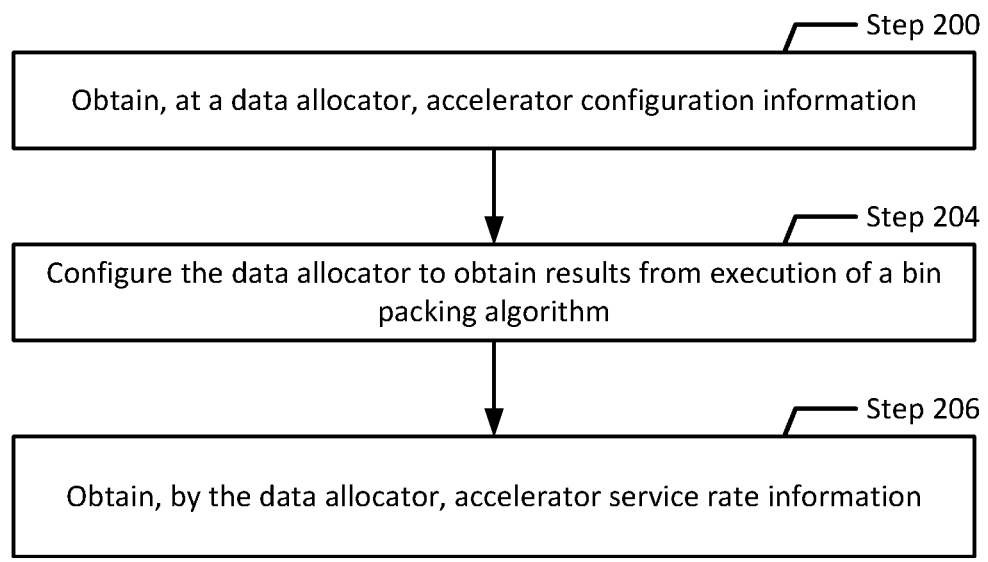
FIG. 2 illustrates an overview of an example process for configuring a data allocator to process network data units received over a network from any number of data source devices, in accordance with one or more embodiments of this disclosure.

FIG. 2 illustrates an overview of an example process for configuring a data allocator (e.g., the data allocator 116 of FIG. 1) to process network data units received over a network (e.g., the network 120 of FIG. 1) from any number of data source devices (e.g., the data source device A 122 and the data source device N 124 of FIG. 1) at a computing device (e.g., the computing device 100).

Figure 3:
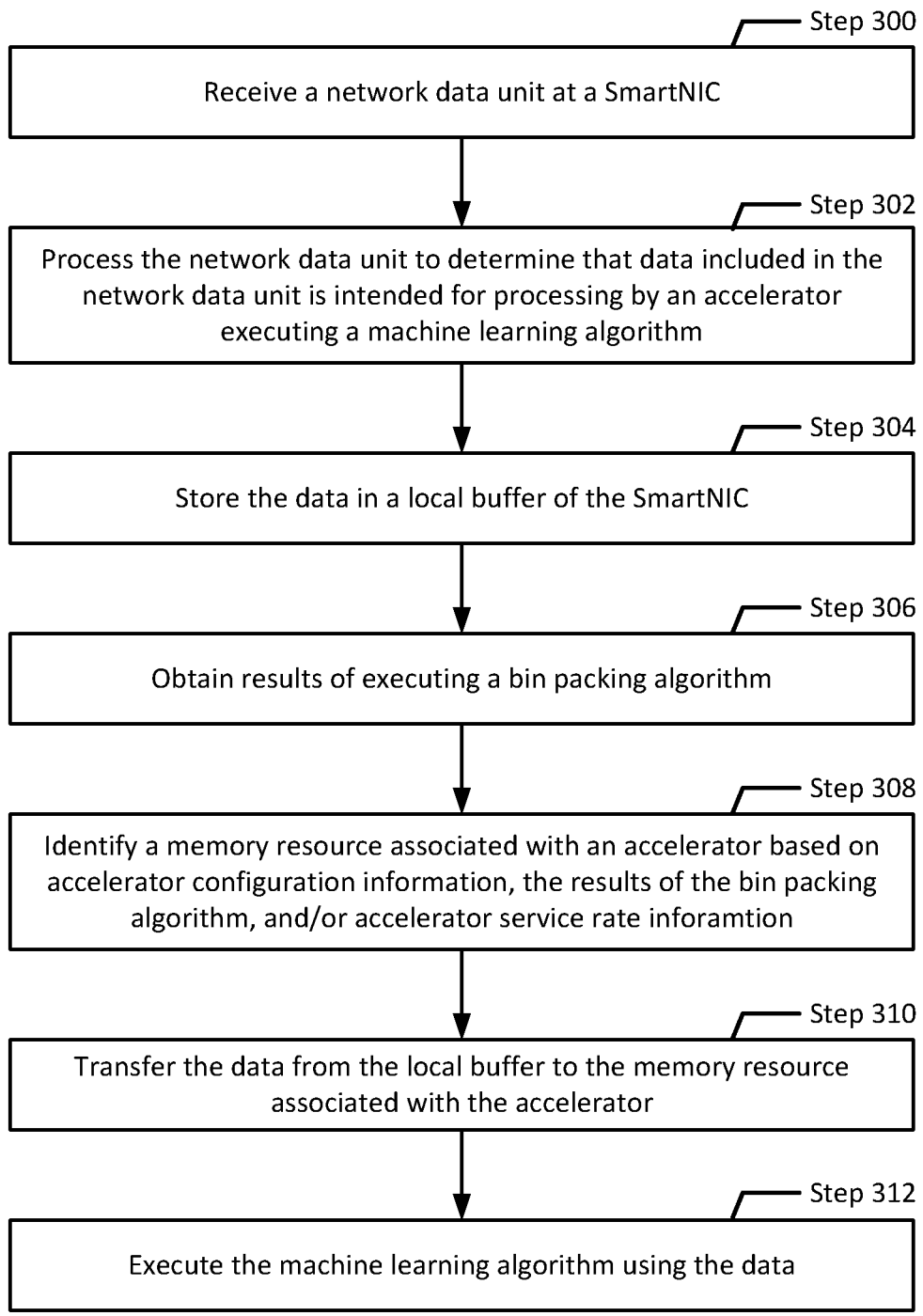
FIG. 3 illustrates an overview of a process for performing data placement by a data allocator of a SmartNIC.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 2 and/or FIG. 3.

In Step 200, the method includes obtaining, at a data allocator (e.g., the data allocator 116 of FIG. 1) accelerator configuration information. In one or more embodiments, accelerator configuration information includes any information related to the configuration of one or more accelerators (e.g., the accelerator 106 of FIG. 1) of a computing device (e.g., the computing device 100 of FIG. 1). Such information may include, but is not limited to, a quantity of accelerators of the computing device; attributes and/or characteristics of one or more accelerators of the computing device (e.g., performance characteristics), amounts of memory resources associated with the accelerators, memory address information of such accelerator memory, applications associated with accelerators (e.g., applications for executing machine learning algorithms), etc.

Accelerator configuration information may also include information related to whether the one or more accelerators are virtualized. In one or more embodiments, virtualizing an accelerator may include dividing an accelerator into any number of portions of the accelerator, each of which may be referred to as an accelerator slice. Each accelerator slice may be associated with its own memory resources and corresponding memory address range(s). Thus, information provided to the data allocator of a SmartNIC subsystem may include, in some embodiments, identification of accelerator slices, associated memory ranges, and applications associated with the accelerator slices and/or memory address ranges.

In one or more embodiments, accelerator configuration information is provided to the data allocator. As an example, a processor (e.g., the processor 102 of FIG. 1) may provide the accelerator configuration information to the data allocator. Accelerator configuration information may be obtained by the data allocator at any point during the operation of a computing device, such as, for example: during start-up of the computing device; during initialization of the SmartNIC, the accelerators, the computing device, the memory resources of the computing device; during a configuration or re-configuration of the SmartNIC, etc.

In Step 202, the method includes configuring the data allocator to obtain results of a bin packing algorithm. In one or more embodiments, the data allocator may place data received from network data units into appropriate memory associated with one or more accelerators based on the results of a bin packing algorithm. Thus, in one or more embodiments, the data allocator is configured to obtain the results to use when performing data placement. In one or more embodiments, a bin packing algorithm is an algorithm designed to solve an optimization problem of where to place data. In the context of embodiments of this disclosure, a bin packing algorithm may be executed to determine which memory resource associated with an accelerator or accelerator slice into which data from a particular one or more network data units should be placed to achieve more optimal execution speeds for machine learning algorithms executing on the accelerators or accelerator slices. As an example, any number of applications configured to use machine learning algorithms may execute on a computing device, and, may be configured to execute the machine learning algorithms using any number of the accelerators and/or accelerator slices of a computing device. In one or more embodiments, the results of such a bin packing algorithm include information indicating a particular memory resource associated with an accelerator and/or accelerator slice into which data received in a network data unit should be placed. In one or more embodiments, a bin packing algorithm is executed by the SmartNIC subsystem to avoid using CPU cycles to execute the bin packing algorithm, and the results may be provided to the data allocator of the SmartNIC subsystem. Additionally, or alternatively, in some embodiments, a SmartNIC subsystem may request one or more CPUs of a computing device to execute a bin packing algorithm and provide the results to the data allocator of the SmartNIC subsystem. In either case, the data allocator may use the results of execution of the bin packing algorithm when making a decision as to which memory resource associated with an accelerator or accelerator slice data received in a network data unit should be placed. Therefore, in one or more embodiments, the data allocator is configured with information that allows the data allocator to obtain the results of execution of a bin packing algorithm by executing a bin packing algorithm locally using the resources of the SmartNIC, or is configured to provide information to a processor of a computing device as part of a request for the processor to execute a bin packing algorithm, with the processor then returning the results to the data allocator.

In Step 204, the method includes obtaining, by the data allocator, accelerator service rate information. In one or more embodiments, the data allocator may be configured to perform data placement for data intended to be used during execution of a machine learning algorithm based at least in part on information related to monitoring service rates of accelerators and/or accelerator slices of a computing device. In certain embodiments, a computing device may be configured with a heterogeneous set of accelerators and associated resources. In such embodiments, the performance of the accelerators may vary (e.g., in a heterogeneous set of accelerators). Thus, it may be advantageous to understand the differing service rates that may be achieved using the different accelerators of a computing device. In one or more embodiments, a service time of an accelerator and/or accelerator slice is the execution time to execute a particular workload, and a service rate is 1/(service time). In one or more embodiments, determining the service times and/or service rates of various accelerators and/or accelerator slices of a computing device includes monitoring execution times of workloads executed using the accelerators and/or accelerator slices.

Such monitoring may be performed, for example, by a monitoring module. Such a monitoring module may execute on a SmartNIC subsystem, one or more processors, or a combination thereof. In one or more embodiments, the monitoring module is configured to cause execution of a workload (e.g., execution of a machine learning algorithm) on the different accelerators and/or accelerator slices, and to measure the execution times of the workloads. The differences in execution time of the workloads may determine, at least in part, an appropriate distribution of data when more than one accelerator and/or accelerator slice is being used to execute one or more machine learning algorithms. As an example, a monitoring module may determine that a given workload (e.g., execution of a machine learning algorithm) executes at a higher service rate when data for the workload is distributed between the accelerators and/or accelerator slices in a particular proportion. In one example, a particular accelerator receives 65% of the data, and another accelerator receives 35% of the data. Such a distribution of data may thus alter a more common 50/50 distribution of the data (e.g., as is done in by various schedulers, such as a Kubernetes scheduler). In one or more embodiments, as discussed above, the monitoring module may execute on the SmartNIC subsystem, the CPU, or a combination thereof. In any case, the results of the analysis of service rates of the various accelerators and/or accelerator slices is provided to the data allocator of the SmartNIC subsystem to be used when determining what memory resource should receive data received in a network data unit and intended to be used by one or more accelerators and/or accelerator slices executing a machine learning algorithm.

FIG. 3 illustrates an overview of a process for performing data placement by a data allocator (e.g., the data allocator 116 of FIG. 1) of a SmartNIC (e.g., the SmartNIC 112 of FIG. 1).

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 2 and/or FIG. 3.

In Step 300, the method includes receiving a network data unit at a SmartNIC of a computing device (e.g., the computing device 100 of FIG. 1). In one or more embodiments, the network data unit is received at the SmartNIC via a network (e.g., the network 120 of FIG. 1). In one or more embodiments, the network data unit is sent over the network by a data source device (e.g., the data source device A 122 or the data source device N 124 of FIG. 1). In one or more embodiments, the network data unit is received at an interface of the SmartNIC.

In Step 302 the method includes processing the network data unit to determine that data included in the network data unit is intended for processing by an accelerator executing a machine learning algorithm. In one or more embodiments, processing the network data unit is performed, at least in part, by the data allocator of the SmartNIC subsystem (e.g., the SmartNIC subsystem 114 of FIG. 1). In one or more embodiments, processing the network data unit includes parsing any one or more fields of the network data unit (e.g., headers, payload, etc.). As an example, the data allocator may parse the network data unit to obtain any number of protocol headers (e.g., IP header, MAC header, TCP header, etc.), and such headers may be used to determine that the network data unit is intended for an application executing on the computing device that is executing a machine learning algorithm.

In Step 304, the method includes storing at least a portion of the data included in the network data unit in a local buffer of the SmartNIC. In one or more embodiments, the data is stored in the local buffer based at least in part on the determination that the data is intended for use in executing a machine learning algorithm.

In Step 306, the method includes obtaining the results of executing a bin packing algorithm or an alternative heuristic algorithm that solves bin packing problem, such as first fit and best fit. In one or more embodiments, obtaining the results of a bin packing algorithm include locally executing a bin packing algorithm on the SmartNIC. In one or more embodiments, obtaining the results of a bin packing algorithm includes providing information (e.g., the size of the data, the application for which the data is intended, etc.) to a processor of the computing device as part of a request for an executing of a bin packing algorithm, and receiving the results from the processor after the execution.

In Step 308, the method includes identifying a memory resource associated with an accelerator based on accelerator configuration information, the results of the bin packing algorithm, and/or accelerator service rate information. As discussed above, accelerator configuration information may include identification of accelerators and/or accelerator slices of a computing device, as well as associations between the accelerators and/or accelerator slices and applications that are configured to execute machine learning algorithms. Thus, the data allocator may identify accelerators or accelerators slices that are associated with the application executing a machine learning algorithm for which the data received in the network data units is intended. Additionally, the results of the bin packing algorithm may be used to identify one or more particular accelerators or accelerator slices that should be used to execute the machine learning algorithm using the data to help improve the efficiency of execution of the machine learning algorithm. Also, the accelerator service rate information may be used when, for example, a machine learning algorithm is executed using more than one accelerator or accelerator slice to determine how to distribute the data among the accelerator or accelerator slices to achieve an improved service rate while executing the machine learning algorithm.

In Step 310, the method includes transferring the data from the local buffer to the memory resource identified in Step 308. In one or more embodiments, the data is directly transferred to one or more memory resources identified in Step 308 directly using a system bus that provides an operative connection between the SmartNIC and the memory resource(s) associated with the relevant one or more accelerators.

In Step 312, the method includes executing the machine learning algorithm using the data. In one or more embodiments, once the data has been placed in the appropriate memory resource(s), the data may be used to execute, at least in part, a machine learning algorithm. As an example, the data may be used as input data for training the machine learning algorithm, validating the machine learning algorithm, and/or executing the machine learning algorithm to obtain a result (e.g., a prediction, a classification, a recognition, a translation, an inference, etc.).

Figure 4:
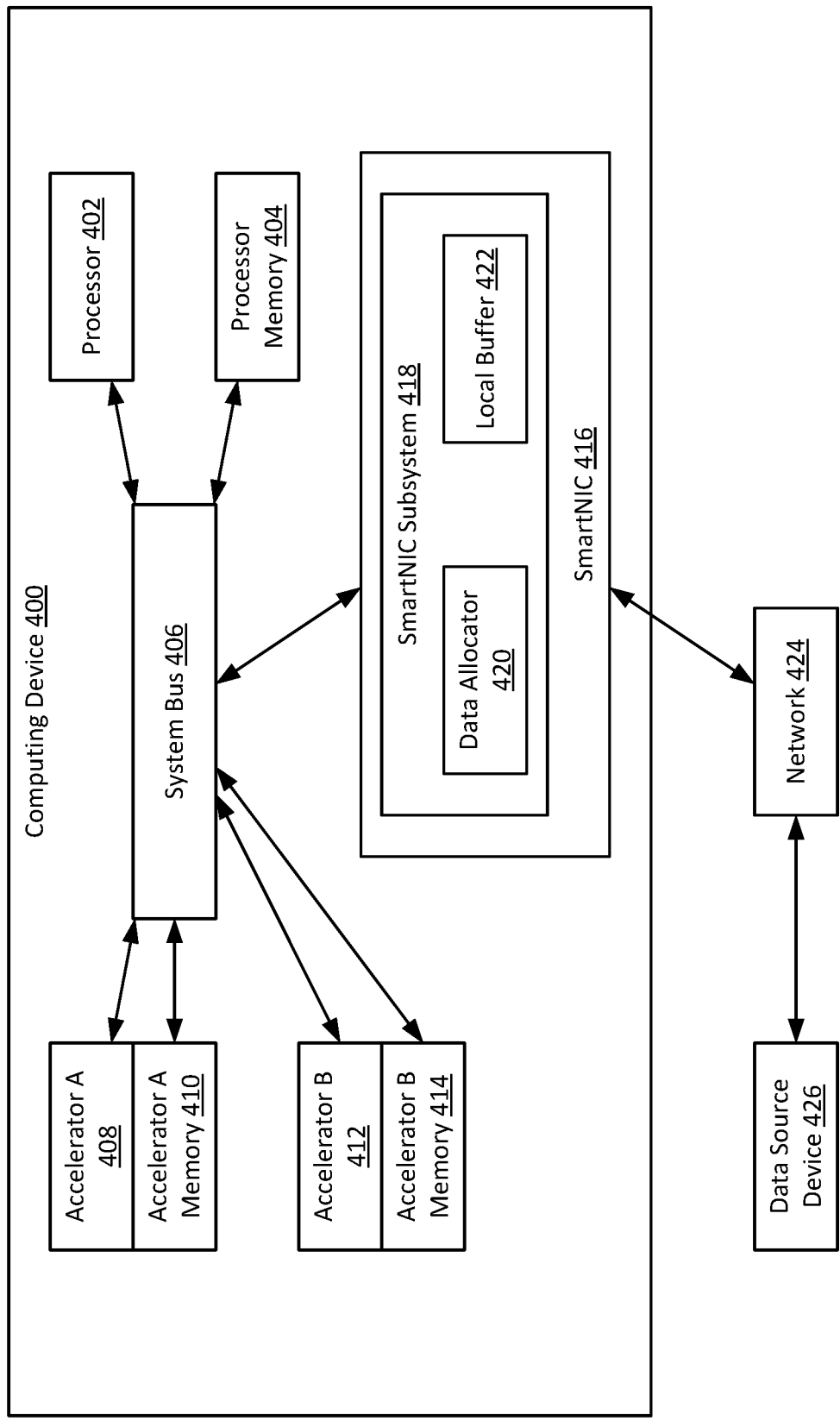
FIG. 4 illustrates an example system for data placement by a data allocator of a SmartNIC, in accordance with one or more embodiments of this disclosure.

FIG. 4 illustrates an example system for data placement by a data allocator of a SmartNIC, in accordance with one or more embodiments of this disclosure. The example shown in FIG. 4 and discussed below is a simplified example intended for explanatory purposes only, and not intended to limit the scope of embodiments described herein. Additionally, while the example shows certain aspects of embodiments described herein, all possible aspects of such embodiments may not be illustrated in this particular example. One of ordinary skill in the art will appreciate that any of the components of the example shown in FIG. 4 may be the same as, or combined with, similarly named and/or numbered components in any other figure, such as, for example, FIG. 1.

Consider a scenario in which a computing device 400 includes a processor 402, processor memory 404, a system bus 406, an accelerator A 408, accelerator A memory 410, accelerator B 412, accelerator B memory 414, a SmartNIC 416, a SmartNIC subsystem 418, a data allocator 420, a local buffer 422, a network 424, and a data source device 426. The SmartNIC 416, the processor 402, the processor memory 404, the accelerators 408 and 412, and the accelerator memories 410 and 414 are connected via the system bus 406. The data source device 426 is operatively connected to the computing device 400 via the network 424 using the SmartNIC 416.

In this scenario, the computing device 400 is configured to execute an application that uses a machine learning algorithm to provide image recognition services. To that end, the data source device 426 is configured to send image data to the computing device 400.

Prior to receiving any image data, the data allocator 420 of the SmartNIC 416 is configured to offload processing of such image data to the SmartNIC subsystem 418, thereby reducing the processing load on the processor 402. The data allocator 420 obtains accelerator configuration information from the processor 402. The accelerator configuration information includes that the accelerator A 408 and the accelerator B have each been virtualized into four accelerator slices each. The accelerator configuration information also includes pointers to memory address ranges in the accelerator A memory 410 and the accelerator B memory 414 corresponding to each of the eight accelerator slices. The accelerator configuration information also includes that the image recognition application is associated with two accelerator slices from each of the two accelerators. Additionally, the data allocator 420 is configured to execute a bin packing algorithm locally when determining accelerator memory in which to place data from received network data units. Lastly, the data allocator is configured with service rate information for the accelerator A 408 and the accelerator B 412. Specifically, the data allocator 420 is configured to be aware that the best service rate for executing machine learning algorithms on the two accelerators is achieved when 65% of the data to be provided to the accelerators for a machine learning algorithm is provided to the accelerator A 408, and the other 35% is provided to the accelerator B 412. After the data allocator 420 of the SmartNIC 416 is configured as discussed above, the data allocator is ready to begin receiving and processing network data units.

Next, a network data unit is received at the SmartNIC 416. The data allocator 420 parses the network data unit, and determines, based on certain headers included in the network data unit, that data included in the payload of the network data unit is intended for the image recognition application, which is configured to use the data to execute a machine learning algorithm to perform the image recognition using the accelerator A 408 and the accelerator B 412.

Based on the aforementioned determination, the data allocator stores the data from the network data unit in the local buffer 422. The data allocator 420 then executes a bin packing algorithm, which determines that the data should be placed in memory of the accelerator A memory 410 associated with a particular accelerator slice of the accelerator A and in memory of the accelerator B memory 414 associated with a particular accelerator slice of the accelerator B 412. The data allocator 420 has pointers to the memory address ranges from the accelerator configuration information previously received from the processor 402. Thus, based on the accelerator configuration information, the results of the bin packing algorithm, and the previously received accelerator service rate information, the data allocator 420 places 65% of the data received in the network data unit in the appropriate memory address of the accelerator A memory 410, and 35% of the data in the appropriate memory address of the accelerator B memory 414. Once the data placement is complete, the accelerator slices associated with the memory address ranges into which the data was placed are used to execute the machine learning algorithm to perform image recognition using the data.

In the above simple example, the data placement was performed without using any processor cycles of the processor 402 or any of the processor memory 404 after the initial configuration of the data allocator. Thus, the performance of the computing device 400 is improved, as the SmartNIC effectively offloaded processing of the received network data unit with the image data.

Figure 5:
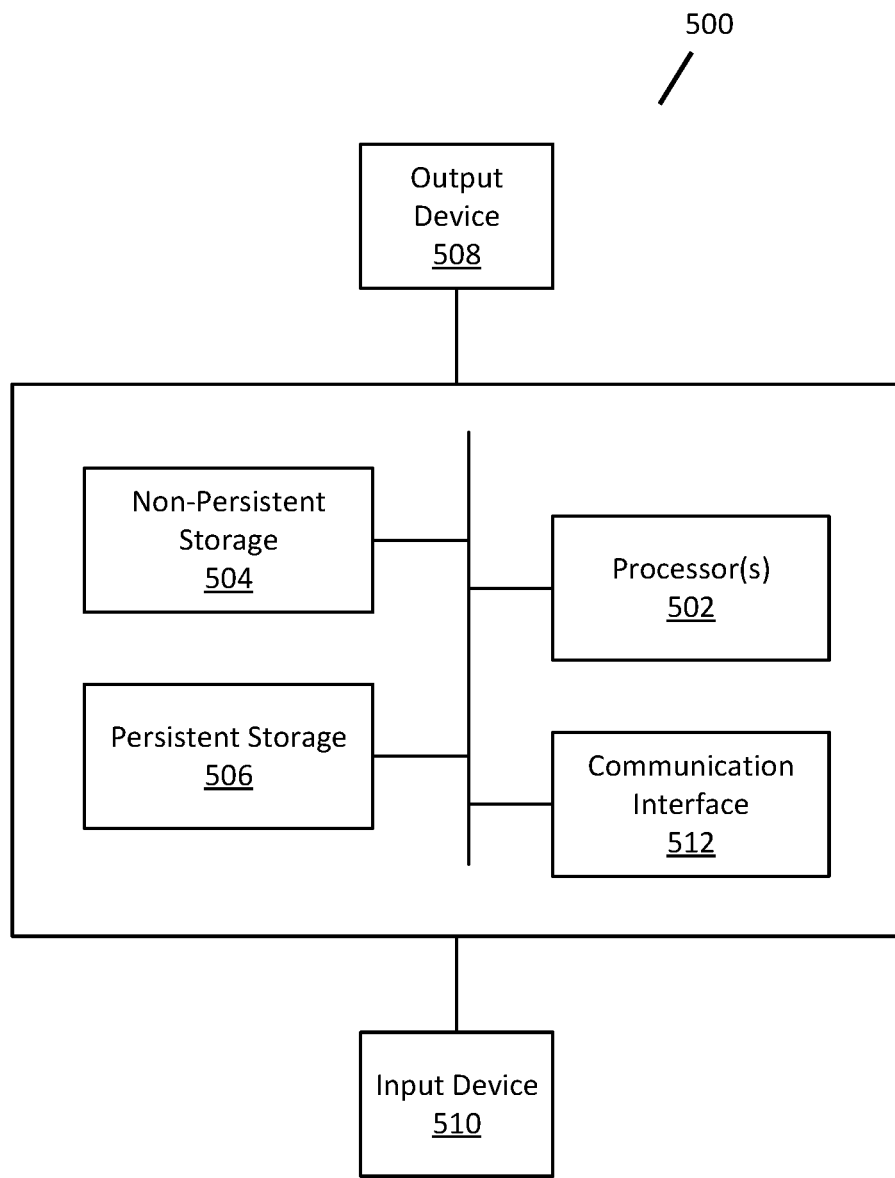
FIG. 5 illustrates a block diagram of a computing device, in accordance with one or more embodiments of this disclosure.

FIG. 5 illustrates a block diagram of a computing device, in accordance with one or more embodiments of this disclosure. As discussed above, embodiments described herein may be implemented using computing devices. For example, all or any portion of the components shown in FIG. 1 may be implemented, at least in part, using one or more computing devices. The computing device 500 may include one or more computer processors 502, non-persistent storage 504 (e.g., volatile memory, such as random access memory (RAM), cache memory, etc.), persistent storage 506 (e.g., a hard disk, an optical drive such as a compact disk (CD) drive or digital versatile disk (DVD) drive, a flash memory, etc.), a communication interface 512 (e.g., Bluetooth interface, infrared interface, network interface, optical interface, etc.), input devices 510, output devices 508, and numerous other elements (not shown) and functionalities. Each of these components is described below.

In one or more embodiments, the computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. Although only one processor 502 is shown in FIG. 5, the computing device 500 may include any number of processors without departing from the scope of embodiments disclosed herein.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. In one or more embodiments, the computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multimodal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3 G/4 G/5 G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory, or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples of embodiments described herein. It will be understood by those skilled in the art (who also have the benefit of this Detailed Description) that one or more embodiments described herein may be practiced without these specific details, and that numerous variations or modifications may be possible without departing from the scope of the embodiments described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various embodiments described herein, may be equivalent to one or more same or similarly named and/or numbered components described with regard to any other figure. For brevity, descriptions of these components may not be repeated with regard to each figure. Thus, each and every embodiment of the components of each figure is incorporated by reference and assumed to be optionally present within every other figure having one or more same or similarly named and/or numbered components. Additionally, in accordance with various embodiments described herein, any description of the components of a figure is to be interpreted as an optional embodiment, which may be implemented in addition to, in conjunction with, or in place of the embodiments described with regard to a corresponding one or more same or similarly named and/or numbered component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A computing device, comprising:
    one or more processors;
    a Smart network interface card (SmartNIC) comprising a SmartNIC subsystem comprising a data allocator and a local buffer;
    an accelerator; and
    one or more non-transitory computer readable media storing instruction which, when executed by the SmartNIC subsystem, cause the SmartNIC subsystem to:
        receive, at an interface of the SmartNIC, via a network, a network data unit;
        process, by the data allocator, the network data unit to make a determination that data included in the network data unit is intended for processing by the accelerator, wherein the accelerator is configured to execute a machine learning algorithm;
        store, by the data allocator and based on the determination, the data in the local buffer;
        identify, by the data allocator, a memory resource associated with the accelerator;
        transfer the data from the local buffer to the memory resource; and
    the instructions further cause the accelerator to execute the machine learning algorithm using the data.

2. The computing device of claim 1, wherein the instructions further cause the SmartNIC to:
    obtain, before receiving the network data unit, accelerator configuration information from the one or more processors.

3. The computing device of claim 2, wherein the instructions further cause the SmartNIC to be configured to execute a bin packing algorithm.

4. The computing device of claim 2, wherein the instructions further cause the SmartNIC to be configured to request that the one or more processors execute a bin packing algorithm.

5. The computing device of claim 2, wherein the instructions further cause the SmartNIC to:
    obtain, before receiving the network data unit, accelerator service rate information corresponding to the accelerator.

6. The computing device of claim 2, wherein the accelerator configuration information includes accelerator virtualization information comprising identification of a plurality of accelerator slices of the accelerator.

7. The computing device of claim 6, wherein the memory resource corresponds to an accelerator slice of the plurality of accelerator slices,
alternative heuristic algorithm.

8. The computing device of claim 2, wherein the instructions further cause the SmartNIC to be configured to execute an alternative heuristic algorithm.

9. A method, comprising:
    receiving, at an interface of a Smart network interface card (SmartNIC) of a computing device, via a network, a network data unit;
    processing, by a data allocator of a SmartNIC subsystem of the SmartNIC, the network data unit to make a determination that data included in the network data unit is intended for processing by an accelerator of the computing device, wherein the accelerator is configured to execute a machine learning algorithm;
    storing, by the data allocator and based on the determination, the data in a local buffer of the SmartNIC subsystem;
    identifying, by the data allocator, a memory resource associated with the accelerator; and
    transferring the data from the local buffer to the memory resource.

10. The method of claim 9, further comprising
    obtaining, before receiving the network data unit, accelerator configuration information from one or more processors of the computing device.

11. The method of claim 10, further comprising configuring the SmartNIC to execute a bin packing algorithm.

12. The method of claim 10, further comprising configuring the SmartNIC to request that the one or more processors execute a bin packing algorithm.

13. The method of claim 10, further comprising:
    obtaining, by the SmartNIC and before receiving the network data unit, accelerator service rate information corresponding to the accelerator.

14. The method of claim 10, wherein the accelerator configuration information includes accelerator virtualization information comprising identification of a plurality of accelerator slices of the accelerator.

15. The method of claim 14, wherein the memory resource corresponds to an accelerator slice of the plurality of accelerator slices.

16. A non-transitory computer-readable medium storing programming for execution by one or more processing units of a Smart network interface card (SmartNIC), the programming comprising instructions to:
    receive, at an interface of the SmartNIC of a computing device, via a network, a network data unit;
    process, by a data allocator of a SmartNIC subsystem of the SmartNIC, the network data unit to make a determination that data included in the network data unit is intended for processing by an accelerator of the computing device, wherein the accelerator is configured to execute a machine learning algorithm;
    store, by the data allocator and based on the determination, the data in a local buffer of the SmartNIC subsystem;
    identify, by the data allocator, a memory resource associated with the accelerator; and
    transfer the data from the local buffer to the memory resource.

17. The non-transitory computer-readable medium of claim 16, wherein the programming comprises further instructions to:

obtain, before receiving the network data unit, accelerator configuration information from one or more processors of the computing device.

18. The non-transitory computer-readable medium of claim 17, wherein the programming comprises further instructions to configure the SmartNIC to execute a bin packing algorithm.

19. The non-transitory computer-readable medium of claim 17, wherein the programming comprises further instructions to:
   obtain, by the SmartNIC and before receiving the network data unit, accelerator service rate information corresponding to the accelerator.

20. The non-transitory computer-readable medium of claim 17, wherein the accelerator configuration information includes accelerator virtualization information comprising identification of a plurality of accelerator slices of the accelerator, and the memory resource corresponds to an accelerator slice of the plurality of accelerator slices.

* * * * *